Figure 1:
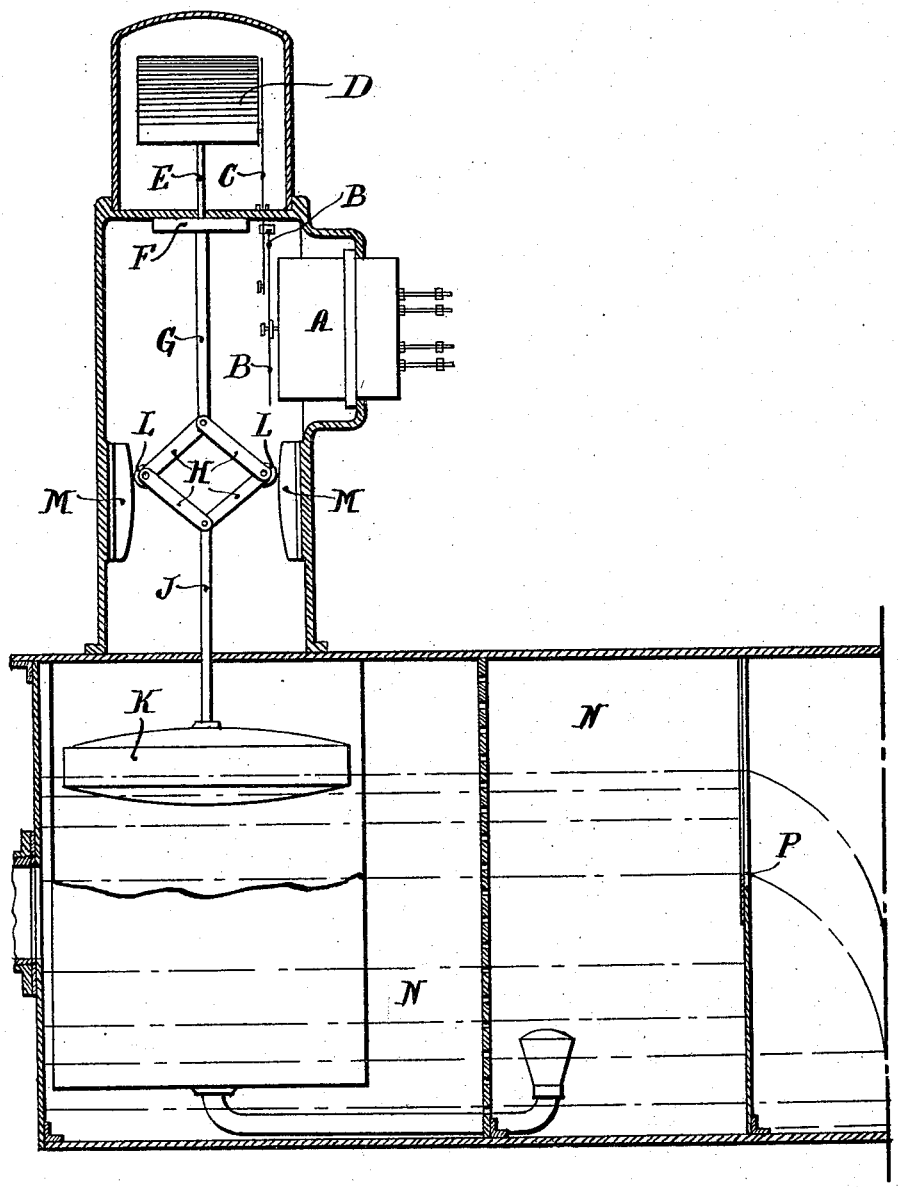

A. W. CLARKE.
RECORDING LOGARITHMIC APPARATUS.
APPLICATION FILED MAR. 30, 1915.

1,188,248.

Patented June 20, 1916.
2 SHEETS—SHEET 1.

INVENTOR
ATHOL WILFRID CLARKE

A. W. CLARKE.
RECORDING LOGARITHMIC APPARATUS.
APPLICATION FILED MAR. 30, 1915.
1,188,248.
Patented June 20, 1916.
2 SHEETS—SHEET 2.
FIG. 3.
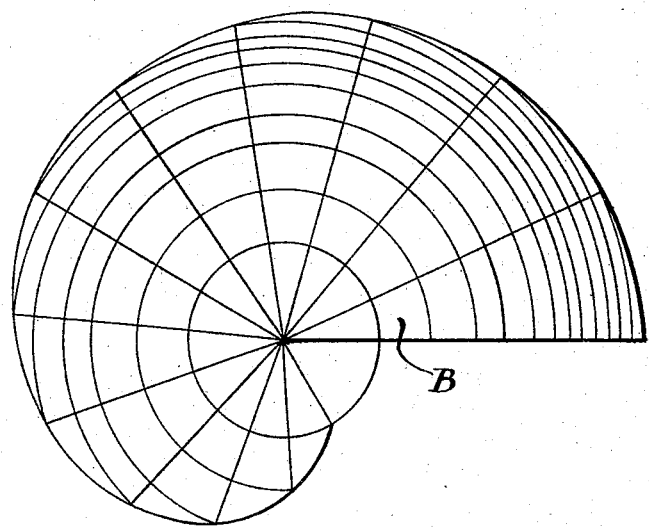
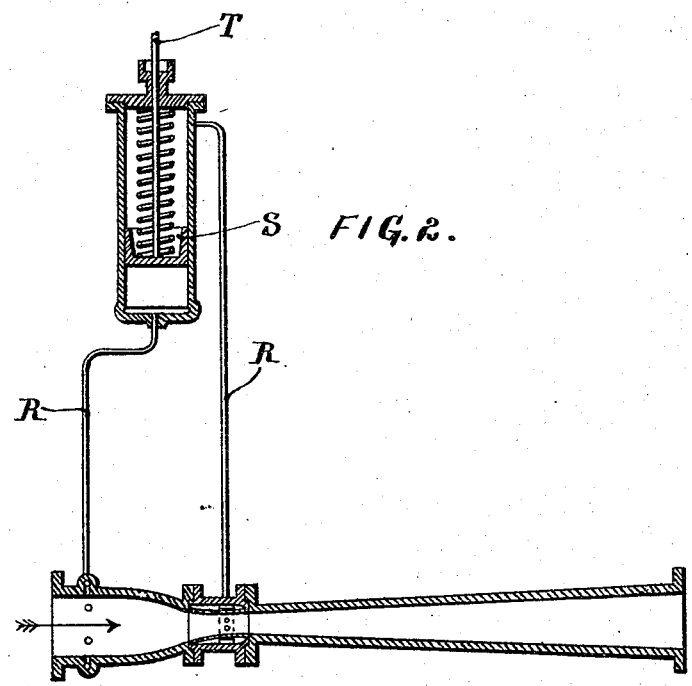
FIG. 2.
INVENTOR
ATHOL WILFRID CLARKE
BY *Howson and Howson*
Attorneys

UNITED STATES PATENT OFFICE.

ATHOL WILFRID CLARKE, OF CHORLTON-CUM-HARDY, MANCHESTER, ENGLAND.

RECORDING LOGARITHMIC APPARATUS.

1,188,248.      Specification of Letters Patent.      Patented June 20, 1916.

Application filed March 30, 1915. Serial No. 18,199.

*To all whom it may concern:*

Be it known that I, ATHOL WILFRID CLARKE, a subject of the King of Great Britain and Ireland, and a resident of Chorlton-cum-Hardy, Manchester, England, have invented a certain new and useful Recording Logarithmic Apparatus, of which the following is a specification.

The invention relates to apparatus of the kind based on a logarithmic principle by which logarithmic multiplication or division can be performed, and has for its object to provide an improved form of such apparatus applicable for measuring physical quantities that vary within a range of values and which are therefore not of a continually increasing nature as are the indications of an electric total quantity or energy meter for instance. For example, for indicating or recording the efficiency of a steam electric-generating set in terms of steam consumption in pounds per kilowatt hour, of a steam engine in terms of pounds of steam per horse-power hour, of an internal combustion engine in terms of fuel quantity per horse-power hour, or for indicating or recording the shaft horse power of a prime mover. That is to say an apparatus for indicating or recording the efficiency between two machines, or the relation between input and output in terms of the resultant of their division, or their multiplication one by the other.

An apparatus made according to the invention comprises essentially two quantity-measuring instruments which may be of known form and means whereby one of the measuring instruments moves a clock driven drum or a scale or dial logarithmically but in a different direction from the clock movement, and the other instrument a pen, traversing the drum or a pointer traversing the scale or dial, logarithmically. The two logarithmic movements take place along the same directional axis so that the trace (or reading) represents the sum or difference of two logarithms.

In carrying out the invention and taking as an example an apparatus for indicating or recording the pounds of steam used per kilo-watt hour in a steam electric-generating set, there is applied to the indicating spindle of an ordinary watt-meter a cam operatively connected to the moving member, and so shaped as to transform the scale of the watt-meter to a logarithmic movement. To an instrument for measuring the quantity of steam flowing—for example a steamflow meter, but preferably a meter for the measurement of the water of condensation—is similarly connected the second moving member in suchwise that it moves logarithmically also. The two members are so arranged that they move parallel to one another in the same plane, and between them, and connected to one of them by links or equivalents is a clock-driven drum or equivalent, while the other carries a pen or pointer traversing the drum. When the water of condensation is measured, the meter for it may very conveniently be of that type in which the outflow from a tank is over a weir, or through a V-notch, there being a float in the tank, in which case the float may be operatively connected to the moving member through linkage or equivalent devices adapted to give the proper relation of movement between the float and the moving member. Or the notch or weir may be of such contour that it directly gives a logarithmic movement to the float in accordance with the volume of water passing.

Such an apparatus is diagrammatically illustrated by way of example on two sheets of explanatory drawings, Figure 1, Sheet 1 being a sectional elevation thereof, and Fig. 2, Sheet 2 a like view of an alternative form of water-measuring device, while in Fig. 3, Sheet 2 is shown a cam giving the necessary logarithmic movement.

In this example there is a watt-meter A of known form the spindle of which is extended and carries a cam B, the logarithmically acting contour of which is shown with its constructional lines in Fig. 3. This cam operates a vertical spindle C carrying a pen or stylus traversing logarithmically divided paper on a drum D which is carried on a vertical spindle E so connected firstly with a clock train F that it is rotated, and secondly with a spindle G that it moves vertically conjointly with that spindle. To the lower end of the spindle G is pivoted a system of toggle links H which connects that spindle with a spindle J carrying a float K. The lateral points of connection of the toggle link system H bear rollers L engaging cam shaped guides M. A spring may be arranged laterally between the links of the toggle system to balance or partially balance the drum D.

The float K is in a measuring tank N of well-known form the outlet from which is by way of a V-notch P. The tank is provided with usual baffles and other means for insuring that the float acts in practically still water. Instead of the tank and V-notch, there may be substituted a Venturi *vena contracta* such as is shown in Fig. 2, the pressure difference due to velocity differences at inlet and throat communicating motion by way of pipes R to a spring controlled piston S the rod T of which is connected to the toggle link system H.

The cam guides M are of course so contoured that the motion of the float spindle J is transformed by their action on the toggle linkage to a logarithmic motion of the spindle G and so of the drum D. While the logarithmic motion is thus imparted to the spindle G through the cams M, it is to be clearly understood that the invention is not limited to this particular means of attaining the desired result. Nor is the invention limited in its application to the measurement of the flow of water.

Various other ways of accomplishing the same or equivalent result and applying it to the recording of other phenomena than the flow of water, will readily occur to those skilled in the art without departing from the invention as pointed out in the subjoined claims. It may be applied in any suitable manner to the indicating or recording of any two "input" quantities into one "output" quantity.

It is to be observed that an apparatus made according to the invention involving, as it in all cases does, means for producing logarithmic motions, the additive or subtractive effect of which is multiplication or division of the unit measurements, materially differs from those mechanisms in which an inferential water meter and a clock conjointly operate a counting mechanism totaling gallons or other measures.

It is further to be observed that it has herein been assumed that the scales of the measuring instruments are each of equal divisions—it is obvious that if they are not, a correction must be applied such that the final movement is not logarithmic of them but logarithmic of them reduced to equal divisions.

What I claim is:—

1. In a logarithmic apparatus of the type described, two measuring instruments of known form, a clock driven drum on one instrument, means whereby this instrument moves the drum logarithmically but in a different direction from the clock movement and means whereby the other measuring instrument moves a pen or pointer, traversing the drum, logarithmically, the two logarithmic movements being along the same general path, as described.

2. In a logarithmic apparatus of the type described, a drum, a vertical spindle connecting the drum with a usual clock train, a second spindle connected at one end to the clock train, toggle links connected to the other end, means for actuating the toggle links from one measuring instrument, a cam on the spindle of the other measuring instrument, a vertical spindle operated from the cam, and a pen or pointer carried by the spindle, as described.

3. In a logarithmic apparatus of the type described, a drum, a vertical spindle connecting the drum with a usual clock train, a second spindle connected at one end to the clock train, toggle links connected to the other end, a third spindle connected at its upper end to the toggle links, a device operated by the rise and fall of water to be measured and operatively connected to the third spindle, rollers on the lateral points of connection of the toggle links, cam shaped guides with which the rollers engage, a cam on the spindle of the other measuring instrument, a vertical spindle operated from the cam, and a pen or pointer carried by the spindle, as described.

4. In a logarithmic apparatus of the type described, a drum, a vertical spindle connecting the drum with a usual clock train, a second spindle connected at one end to the clock train, toggle links connected to the other end, a third spindle connected at its upper end to the toggle links, a float connected to the lower end of this third spindle, a measuring tank having a V-notch outlet in which the float works, rollers on the lateral points of connection of the toggle links, cam shaped guides with which the rollers engage, a cam on the spindle of the other measuring instrument, a vertical spindle operated from the cam, and a pen or pointer carried by the spindle, as described.

In testimony whereof I have signed my name to this specification, in the presence of two subscribing witnesses.

ATHOL WILFRID CLARKE.

Witnesses:
DAVID FERGUSON,
WILFRED HUNT.

Copies of this patent may be obtained for five cents each, by addressing the "Commissioner of Patents, Washington, D. C."